(12) United States Patent
Wong et al.

(10) Patent No.: US 10,890,690 B2
(45) Date of Patent: Jan. 12, 2021

(54) ANTIREFLECTIVE SYNTHETIC BROCHOSOMAL COATINGS

(71) Applicant: The Penn State Research Foundation, University Park, PA (US)

(72) Inventors: Tak-Sing Wong, University Park, PA (US); Shikuan Yang, University Park, PA (US); Nan Sun, University Park, PA (US); Birgitt Boschitsch, University Park, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 188 days.

(21) Appl. No.: 15/946,004

(22) Filed: Apr. 5, 2018

(65) Prior Publication Data

US 2018/0292579 A1    Oct. 11, 2018

Related U.S. Application Data

(60) Provisional application No. 62/481,782, filed on Apr. 5, 2017.

(51) Int. Cl.
*G02B 1/116* (2015.01)
*C25D 5/02* (2006.01)
(Continued)

(52) U.S. Cl.
CPC ............... *G02B 1/116* (2013.01); *B22F 9/24* (2013.01); *C22C 5/02* (2013.01); *C22C 5/06* (2013.01); *C25D 1/003* (2013.01); *C25D 1/006* (2013.01); *C25D 5/02* (2013.01); *C25D 7/00* (2013.01); *C25D 7/006* (2013.01); *C25D 9/06* (2013.01); *C25D 13/12* (2013.01); *B22F 1/0011* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2011/0177240 A1* | 7/2011 | Saiki | G02B 5/0215 427/162 |
| 2012/0214001 A1* | 8/2012 | Little | B01J 13/18 428/403 |
| 2013/0098438 A1* | 4/2013 | Kawai | H01L 31/055 136/256 |

OTHER PUBLICATIONS

Jin-Tun Lin, "Identification of Photoreceptor Locations in the Compound Eye of Coccinella septempunctata Linneaus (Coleoptera, Coccinellidae)," J. Insect Physiol., vol. 39, No. 7, (1993) pp. 555-562.

(Continued)

*Primary Examiner* — Anthony J Frost
(74) *Attorney, Agent, or Firm* — Quarles & Brady LLP

(57) ABSTRACT

Synthetic brochosomes can be prepared by disposing a monolayer of first polymer microspheres on a substrate and forming a layer of metal on the monolayer of the first polymer microspheres. A monolayer of second polymer microspheres is then disposed on the layer of metal to form a template. The second polymer microspheres are smaller than the first polymer microspheres. A brochosome material is then electrodeposited on the template. The brochosome material is selected from the group consisting of a metal, a metal oxide, a polymer or a hybrid thereof. The first polymer microspheres and the second polymer microspheres are then removed to form a coating of synthetic brochosomes of the brochosome material on the substrate.

11 Claims, 4 Drawing Sheets

Three Dimensional Scheme of Brochosome-Inspired Coating

Cross Section of a Single Brochosome

(51) Int. Cl.
*C25D 7/00* (2006.01)
*C25D 9/06* (2006.01)
*C25D 1/00* (2006.01)
*B22F 9/24* (2006.01)
*C25D 13/12* (2006.01)
*C22C 5/06* (2006.01)
*C22C 5/02* (2006.01)
*C25D 3/48* (2006.01)
*C25D 3/46* (2006.01)
*C25D 3/12* (2006.01)
*C22C 5/00* (2006.01)
*C22C 1/04* (2006.01)
*B22F 1/00* (2006.01)
*B22F 7/04* (2006.01)
*B22F 1/02* (2006.01)

(52) U.S. Cl.
CPC ............... *B22F 1/02* (2013.01); *B22F 1/025* (2013.01); *B22F 2007/045* (2013.01); *C22C 1/0466* (2013.01); *C22C 5/00* (2013.01); *C25D 3/12* (2013.01); *C25D 3/46* (2013.01); *C25D 3/48* (2013.01)

(56) References Cited

OTHER PUBLICATIONS

C. Kang et al., "The fabrication of patternable silicon nanotips using deep reactive ion etching," Journal of Micromechanics and Microengineering, 18 (2008) pp. 1-7.
H. Hofer et al., "Organization of Human trichromatic Cone Mosaic," The Journal of Neuroscience, Oct. 19, 2005, 25(42):9669-9679.
S. Yang et al., "Surface Nanometer-Scale Patterning in Realizing Large-Scale Ordered Arrays of Metallic Nanoshells with Well-Defined Structures and Controllable Properties," Advanced Functional Materials, 2010, 20 pp. 2527-2533.
S. Yang et al., "Ultra-antireflective synthetic brochosomes," Nature Communications, 8:1285 (2017) pp. 1-8.
J. Troscianko et al., "Image calibration and analysis toolbox—a free software suite for objectively measuring reflectance, colour and pattern," Methods in Ecology and Evolution, (2015) 6:1320-1331.
T.V. Teperik et al., "Omnidirectional absorption in nanostructured metal surfaces," Letters, vol. 2, May 2008, pp. 299-301.
A. Siddiqi et al., "Interspecific and intraspecific views of color signals in the strawberry poison frog dendrobates pumilio," The Journal of Experimental Biology, (2004) 207:2471-2485.
D. Osorio et al., "Photoreceptor sectral sensitivities in terrestrial animals: adaptations for luminance and colour vision," Proceedings of the Royal Society B, (2005), 272:1745-1752.

\* cited by examiner

Three Dimensional Scheme of Brochosome-Inspired Coating

Cross Section of a Single Brochosome

ANTIREFLECTIVE SYNTHETIC BROCHOSOMAL COATINGS

CROSS-REFERENCE TO RELATED APPLICATION

This application claims the benefit of U.S. Provisional Application No. 62/481,782 filed Apr. 5, 2017 the entire disclosure of which is hereby incorporated by reference herein for all purposes.

STATEMENT REGARDING FEDERALLY SPONSORED RESEARCH

This invention was made with government support under Grant No. CMMI1351462 awarded by the National Science Foundation (NSF) and under Grant No. D14AP00042, awarded by the Defense Advanced Research Projects Agency (DARPA). The Government has certain rights in the invention.

TECHNICAL FIELD

The present disclosure relates to synthetic brochosomal coatings on a variety of substrates and processes therefor.

BACKGROUND

Natural surfaces have demonstrated how different micro/nanoscale surface architectures can yield an array of distinct interfacial functions. While many of these surface structures can now be manufactured using advanced manufacturing techniques, scalable fabrication methods capable of producing a number of these natural structures have remained elusive. Among these natural structures are leafhopper-produced brochosomes. Naturally occurring brochosomes are microscale granules with nanoscale surface indentations arranged in a honeycomb pattern, making the geometry of a brochosome particle similar to those of a soccer ball. Leafhoppers living in different regions create brochosomes with significantly varied structural geometries, with distinct diameters and numbers of pits. In addition to their use as non-sticking coatings, the intricate nanoscale architecture and three-dimensional periodicity of these brochosome coatings (BCs) suggest they may have complex optical properties. However, their optical functions have remained minimally understood as large quantities of brochosomes for systematic study are not readily producible. Micro/nano-manufacturing techniques to create brochosomes of various geometries and material compositions have not been available.

SUMMARY OF THE DISCLOSURE

In an aspect of the present disclosure, synthetic brochosomes are described. Synthetic brochosomes of the present disclosure can include one or more microspheres having surface indentations arranged in a pattern, wherein the brochosomes comprise a metal, a metal oxide, an electrically conductive polymer, and combinations thereof. In one or more of the foregoing and/or following embodiments, the microspheres have a length scale in a range from 1 μm to 10 μm. In some embodiments, the surface indentations have a length scale of 100 nm to 1 μm. In other embodiments, the pattern in which the surface indentations are arranged is a honeycomb pattern. In still further embodiments, a ratio $(R_t/R_b)$ of a radius of $R_t$ of the surface indentations on a given microsphere to a radius $R_b$ of the given microsphere is less than 0.35. In some embodiments, $\sim9\lambda>R_b>\sim1.4\lambda$ ($\lambda$ is wavelength of the electromagnetic waves) and $\sim2\lambda>R_t>\sim0.5\lambda$..

In another aspect of the present disclosure, an antireflective coating includes a layer of synthetic brochosomes disposed on a substrate. In one or more of the foregoing and/or following embodiments, the substrate is electrically conductive. In some embodiments, the layer is a monolayer of synthetic brochosomes. In other embodiments, the coating has a reflectance of less than 10% at a wavelength in a range from 250 nm to 2000 nm. In still further embodiments, the synthetic brochosomes are disposed in the layer in substantially a honeycomb pattern.

In yet another aspect of the present disclosure, a method of preparing synthetic brochosomes includes disposing a layer of first removable spheres on a substrate; forming a layer of an electrically conductive material on the layer of first removable spheres; disposing a layer of second removable spheres on the layer of electrically conductive material to form a template, the second removable spheres being smaller the first removable spheres; electrodepositing a brochosome material on the template, and removing the first removable spheres and the second removable spheres to form synthetic brochosomes of the brochosome material. In one or more of the foregoing and/or following embodiments, the method further comprises isotropic etching of the first removable spheres prior to electrodepositing the brochosome material and removing the first and the removable spheres to reduce the size of the first and removable spheres, thereby releasing the synthetic brochosomes from the substrate following the removing of the first and second removable spheres.

In some embodiments of preparing synthetic brochosomes, disposing the layer of first spheres on the substrate comprises: disposing the first removable spheres on an intermediate substrate; forming a free-standing monolayer of the first removable spheres at an interface of a liquid and air by immersing the intermediate substrate in the liquid, the liquid having a specific gravity greater than that of the first removable spheres and the liquid being substantially inert to the first removable spheres; and transferring the free-standing monolayer onto the substrate. In other embodiments, the first removable spheres comprise polystyrene and the liquid is an aqueous medium. In still further embodiments, the brochosome material comprises a metal, and during electrodepositing the brochosome material, the electrically conductive material of the template is used as a cathode. In some embodiments, the brochosome material is a metal oxide or a conducting polymer, and during electrodepositing the brochosome material, the electrically conductive material of the template is used as an anode.

In yet other embodiments of preparing synthetic brochosomes, the first removable spheres have a length scale in a range from 1 μm to 10 μm. In other embodiments, the second removable spheres have a length scale of 100 nm to 1 μm. In some embodiments, a ratio $(R_t/R_b)$ of a radius of $R_t$ of the second removable spheres to a radius $R_b$ of the first removable spheres is less than 0.35. In still further embodiments, $\sim9\lambda>R_b>\sim1.4\lambda$ ($\lambda$ is wavelength of the electromagnetic waves) and $\sim2\lambda>R_t>\sim0.5\lambda$. In other embodiments, the first removable spheres and the second removable spheres are arranged in respective monolayers in substantially a honeycomb pattern.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Antireflective brochosomal coatings exhibit low reflection over a wide spectrum of electromagnetic wavelengths. Such coatings, while present in nature, are difficult to produce synthetically. However, considering the optical properties naturally occurring brochosomes, synthetic brochosomes can used in several advanced applications including, but not limited to, energy harvesting, photovoltaics, light emitting and sensing devices, camouflage materials, etc. The design principles of brochosomal structures and brochosomal coatings for desired antireflection properties, and how to achieve these designs are described herein.

The present disclosure relates to synthetic brochosomes, antireflective coatings using the synthetic brochosomes and methods of making the synthetic brochosomes and the antireflective coatings using the synthetic brochosomes. In an aspect of the present disclosure, the synthetic brochosomes can include microspheres having surface indentations arranged in a pattern.

Figure 1A:
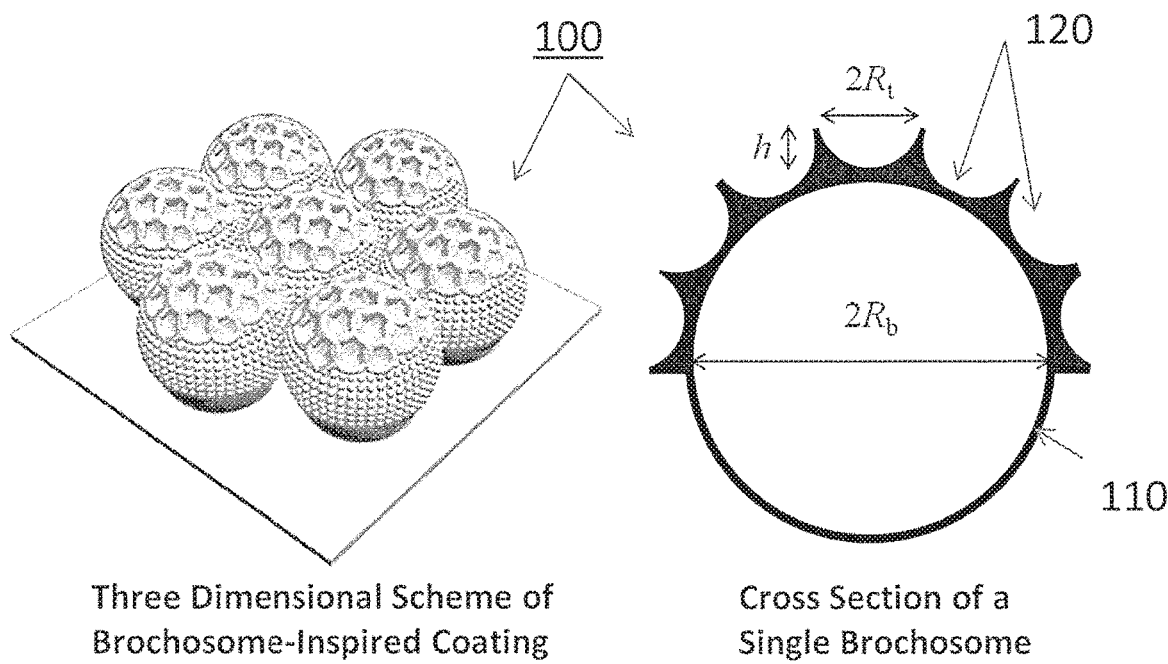
FIG. 1A schematically illustrates the structure of a brochosome.
Figure 1B:
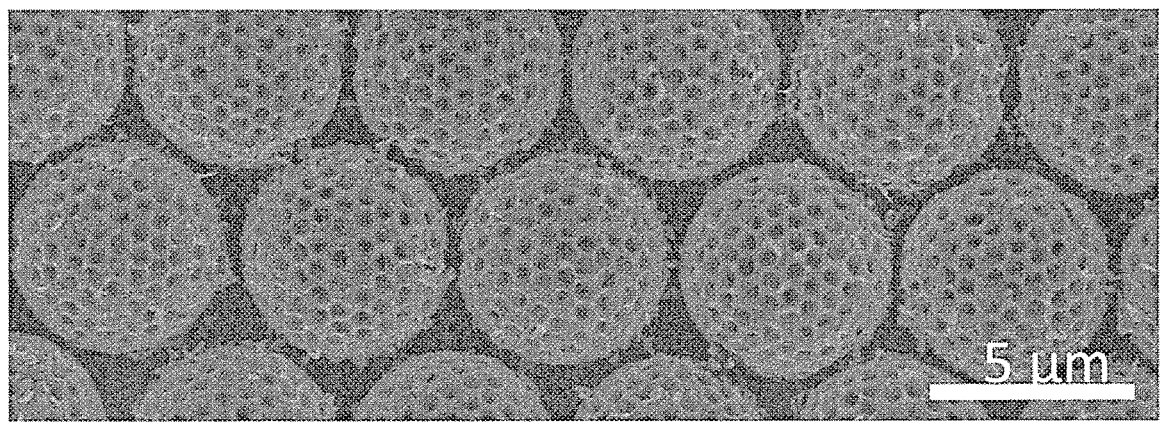
FIG. 1B shows a scanning electron micrograph of a synthetic brochosome in accordance with an embodiment of the present disclosure.

Synthetic brochosomes of the present disclosure have a substantially spherical shape, e.g., a microsphere, with several surface indentations arranged in a pattern. FIG. 1A schematically illustrates the structure of a brochosome in an embodiment of the present disclosure, and FIG. 1B shows a scanning electron micrograph of a synthetic brochosome in accordance with an embodiment of the present disclosure.

As illustrated in the embodiment of FIG. 1A, synthetic brochosomes 100 have spherical portion 110 with radius $R_b$ and several surface indentations (i.e. pits) 120 arranged in a pattern over spherical portion 110. The several surface indentations have a radius ($R_t$) and depth (h).

In an embodiment, the bronchosomes can have a length scale in a range from about 1 μm to about 10 μm. For example, in some embodiments, the diameter of the spherical portion 110 of the brochosome ($2R_b$) is in a range from about 1 μm to about 100 μm. The surface indentations 120 in various embodiments have a length scale in a range from about 100 nm to about 1 μm. For example, the diameter $2R_t$ of individual indentations 120 can be in a range from about 100 nm to about 1 μm. In various embodiments the depth (h) of the pits can be from about 25 nm to about 500 nm.

The synthetic brochosome 100 can be formed from a metal, a metal oxide, a polymer, such as an electrically conductive polymer, and combinations thereof such as a hybrid thereof. Examples of metals include, but are not limited to, silver, gold, nickel, copper, chromium, etc. Examples of metal oxide include, without limitation, manganese oxide, cobalt oxide, zinc oxide, titanium dioxide, etc. Examples of conductive polymers include, without limitations, polypyrrole (PPy) polyaniline, polythiophene, etc.

The present disclosure advantageously provides designs for use of brochosomes as an anti-reflective coating that is capable to minimizing reflected light from a broad range of incident angles over broadband wavelengths. Based on experimental and modeling results it was found that strong omnidirectional antireflection (i.e., reflectance <10%) of these brochosomes as coating can be attained when: $\sim 9\lambda > R_b > \sim 1.4\lambda$ ($\lambda$ is the wavelength of the electromagnetic waves), and $\sim 2\lambda > R_t > \sim 0.5\lambda$, $h \sim 0.55R_t$, and $R_t/R_b < 0.35$ (or $n > \sim 7$), where n is the number of pits (i.e., surface indentations 120) surrounding the brochosome structure.

In an aspect of the present disclosure, a double-layer colloidal crystal (DCC) template combined with site-specific electrochemical growth can be used to prepare synthetic brochosomes (BCs) comprised of metals, metal oxides, polymers, or their hybrids on any electrically conductive substrate. The structure of the synthetic BCs, defined by the diameter of the brochosomes, the inter-brochosome distance, as well as the size (i.e., $R_b$, $R_t$) and depth (i.e., h) of the pits within the brochosomes, can be precisely engineered. For example, it was observed that 2 μm-thick Ag BCs (i.e., BCs comprised of 2 μm diameter brochosomes, or $R_b=1$ μm) are capable of reflecting <~1% on average of any wavelength in the 250-2000 nm optical window. This reflectance is lower than the best existing antireflection materials (e.g., black silicon) with similar thickness. The superior antireflection is attributed to the unique structural geometries of the brochosomes, as demonstrated experimentally and numerically. Advantageously, these BCs can serve also as a camouflage and protective layer.

In another aspect of the present disclosure, an antireflective coating includes a layer of synthetic brochosomes disposed on a substrate. In general, any substrate amenable to electrodeposition can be used as the substrate on which synthetic brochosomes are disposed to form the antireflective coating. In an embodiment, the substrate is electrically conductive. For example, the substrate in some embodiments may be a metallic plate or wafer. In other embodiments, the substrate is a metal coated silicon or glass wafer. In yet other embodiments, the substrate may be suitably primed polymer substrate. For example, the substrate in an embodiment is a polyacrylic (or polyethylene, polypropylene, cellulose acetate butyrate, polyvinyl chloride, etc.)

substrate sprayed with a binder or pruner for anchoring an electroplatable metal. Examples of the binder/primer include, but are not limited to, compositions containing 20 to 90 wt. % of butadiene.

In various embodiments, the layer of synthetic brochosomes includes a monolayer of a single type of brochosomes. In other embodiments, the layer of synthetic brochosomes includes several layers of different types of brochosomes. A "type" of brochosome, as referred to herein, includes brochosomes of a given diameter with a given size/number of indentations on their surface. For example, brochosomes with a diameter of 1 µm and a pit diameter of 200 nm may be one "type" of brochosomes, while those with a diameter of 4.5 µm and a pit diameter of 1 µm may be another type of brochosomes. While the number of layers and the types of brochosomes in those layers is not particularly limited, it is contemplated that the number of layers and the types of brochosomes for those layers will depend on the specific application for which the coating is being used based on the properties of specific types of brochosomes.

Figure 2:
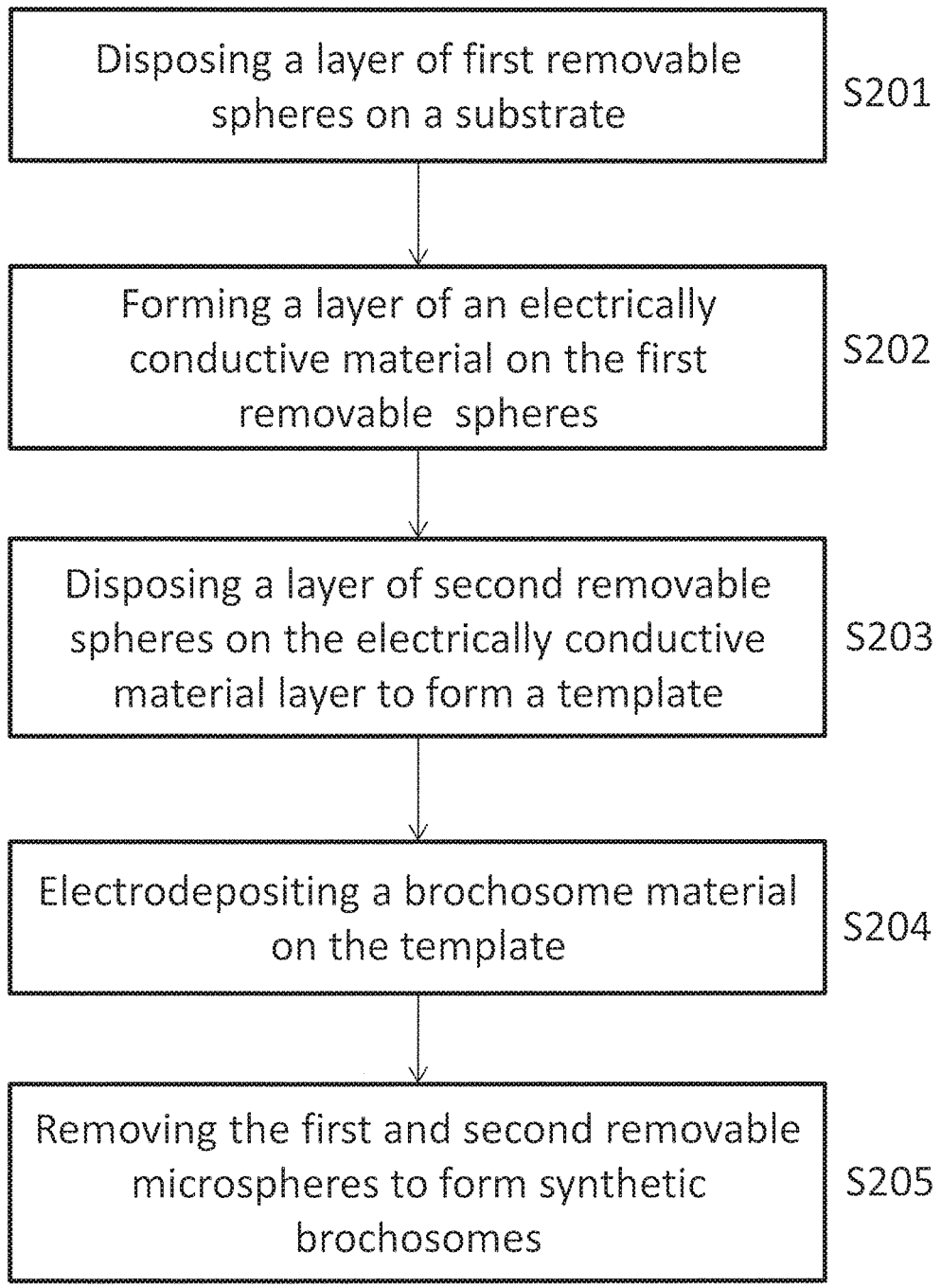
FIG. 2 illustrates a flow chart for a method of preparing synthetic brochosomes in accordance with an embodiment of the present disclosure.

FIG. 2 illustrates a flow chart for a method of preparing synthetic brochosomes in accordance with an embodiment of the present disclosure. In an aspect of the present disclosure, a method of preparing synthetic brochosomes includes, at S201, disposing a layer, e.g., a monolayer, of first removable spheres, e.g., microspheres made of a dissolvable polymer such as polystyrene, on a substrate. At S202, the method forms a layer of an electrically conductive material, e.g., a metal such as gold, on the layer of the first removable spheres. A layer of second removable spheres, e.g., nano-sized spheres or microspheres made from a dissolvable polymer such as polystyrene, is then disposed at S203 on the electrically conductive layer to form a template. The second removable spheres are smaller than the first removable spheres. A brochosome material is then electrodeposited, at S204, on the template. The brochosome material can be selected from among a metal, a metal oxide, a polymer such as a conducting polymer, or combinations thereof such as a hybrid thereof. The first removable spheres and the second removable spheres are then removed, at S205, to form synthetic brochosomes of the brochosome material on the substrate. When the first removable spheres are closely packed while depositing the brochosome material, the synthetic brochosomes can be connected forming a coating of the synthetic brochosomes on the substrate.

The first and second removable spheres can be of any suitable material that can be removed from the brochosome material. Examples of suitable materials include polymers that can be readily dissolved such as polystyrene and copolymers thereof, thermoplastic polymers polyethylene, poly(methyl methacrylate), polypropylene, cellulose acetate, etc. In general, because the first and second spheres are removed in a later step, additional process steps and complexity is reduced if the same material is used for the first removable spheres and the second removable spheres. Thus, the first removable spheres and the second removable spheres differ only in terms of their size. The first removable spheres may have a diameter in the range from about 1 µm to about 10 µm while the second removable spheres may have a diameter in the range from about 100 nm to about 1 µm. The sizes of the respective spheres are selected based on the desired size of the brochosomes and the size of the surface indentations, with the first removable spheres approximately determining the diameter ($2R_b$) the brochosomes and second removable spheres approximately determining the diameter ($2R_t$) of the surface indentations on the brochosomes. Thus, depending on the particular application for which the brochosomes are being prepared, any size within the particular range can be used for the first removable spheres and the second removable spheres with the constraint that the second removable spheres are smaller than the first spheres.

In some embodiments, as has been discussed elsewhere herein, antireflective properties of the brochosomes can be enhanced when $\sim 9\lambda > R_b > \sim 1.4\lambda$ ($\lambda$ is wavelength of the electromagnetic waves), $\sim 2\lambda > R_t > \sim 0.5\lambda$, $h \sim 0.55 R_t$, and $R_t/R_b < 0.35$ (or $n > \sim 7$), where n is the number of pits (i.e., surface indentations 120) surrounding the brochosome structure. Without wishing to be bound by theory, the number of pits are related to the diameter of the brochosome and the size of the surface indentations by the following relation:

$$n = \frac{\pi}{2\sqrt{3}} \left(\frac{R_b}{R_t}\right)^2.$$

Other geometric parameters shown in FIG. 1 include the opening size (2r) and depth (h) of the pits. Depth of the pit, h can be predicted using the following equation (equation describing the height of a spherical cap):

$$h = R_t - \left(\sqrt{R_t^2 - r^2}\right)$$

if $h < R_t$, where $R_t$ is the radius of the top layer (second) spheres.

Figure 3A:
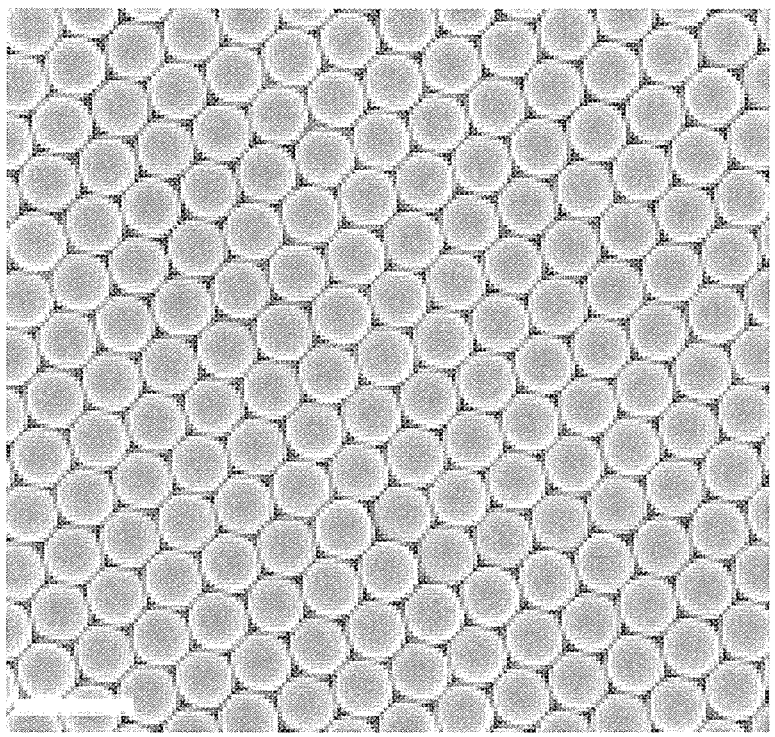
FIG. 3A shows a scanning electron micrograph of a monolayer of first removable microspheres in accordance with an embodiment of the present disclosure.

In various embodiments, disposing, at S201, a monolayer of the first removable spheres on the substrate includes disposing the first removable spheres on an intermediate substrate using a suitable process such as, for example, spin coating. Any suitable intermediate substrate may be used in this process. For example, the intermediate substrate may be a glass slide, a metal plate or a polymer film. The intermediate substrate is then immersed in a suitable liquid on which the spheres can float. For example, in an embodiment, the liquid includes an aqueous medium such as water. Thus, when the intermediate substrate is immersed in such a medium, the spheres, when made of polymeric microspheres can be readily assembled into a monolayer at the air/water interface. In some embodiments, a suitable additive, such as sodium dodecylsulfate (SDS), may be added to the liquid to facilitate the release of the polymer microspheres from the intermediate substrate, e.g., by minimizing the electrostatic attraction between the intermediate substrate and the microspheres. In some embodiments, the intermediate substrate is immersed in the liquid at an angle to further facilitate release and formation of the monolayer of the polymer microspheres. Without wishing to be bound by theory, the electrostatic attraction between neighboring microspheres and the surface tension at the liquid/air interface results in a hexagonally close-packed arrangement of the polymer microspheres in the monolayer. Viewed in plan, this hexagonal close-packed arrangement appears to be substantially a honeycomb arrangement as can be seen in FIG. 3A, which shows a scanning electron micrograph of a monolayer of first removable microspheres (scale bar—2 µm).

The free-standing monolayer of the removable microspheres is then transferred to the substrate by picking up the substrate already immersed in the liquid from under the free-standing monolayer of the removable microspheres. Examples of suitable substrates are provided elsewhere herein.

A layer of an electrically conductive material is formed, at S202, on the monolayer of first removable spheres thus disposed on the substrate. Any suitable method for depositing the electrically conductive material can be used. Suitable methods include physical vapor deposition, electrodeposition, etc. Because electrodeposition can be performed at a relatively lower temperature and uses electrolytes that do not react with polymers such as polystyrene, it may be easier to form the electrically conductive material layer using electrodeposition. Any suitable electrically conductive material such as, for example, gold, silver, nickel, chromium, etc. can be used at S202. In certain embodiments, the electrically conductive material can be the same material as the brochosome material. In other embodiments, the electrically conductive material layer acts as a seed layer for growing the brochosome material.

Figure 3B:
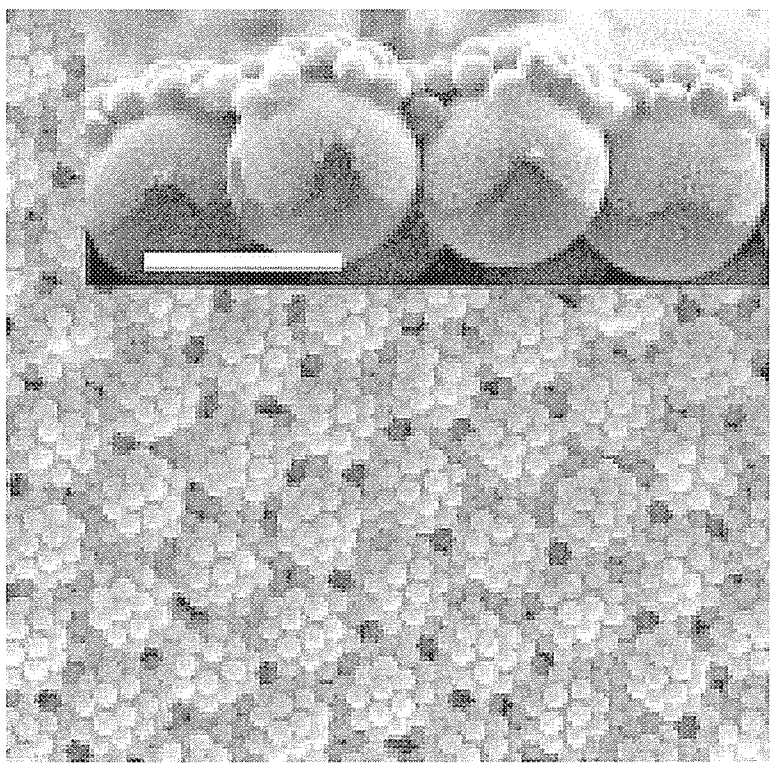
FIG. 3B shows a scanning electron micrograph of a DCC template (the inset showing a side view of the DCC template; scale bar—2 μm) in accordance with an embodiment of the present disclosure.
Figure 4:
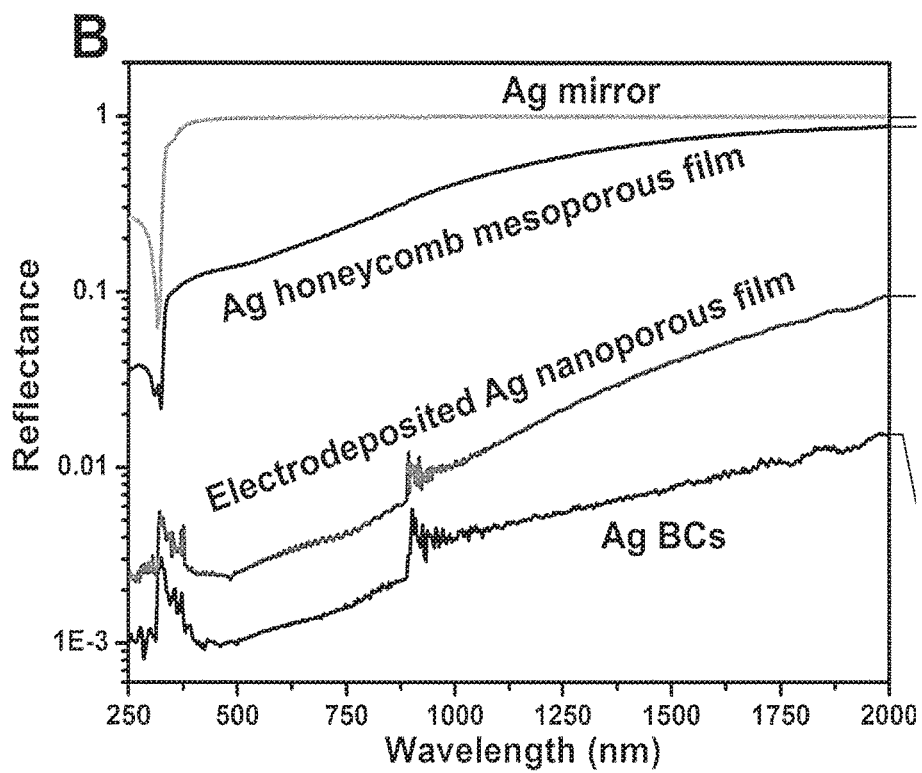
FIG. 4 shows a plot showing the reflection spectra of Ag mirror (in green), Ag honeycomb mesoporous film (in blue), Ag nanoporous film (in red), and Ag BCs (in black). The reflection on the synthetic BCs at an incident angle of 45° in the ultraviolet (UV) (250 nm-380 nm), visible (Vis) (380 nm-780 nm), and near infrared (NIR) (780 nm-2000 nm) region is below 0.4%, 0.2%, and 1.4% respectively when the pit opening size is ~470 nm with a depth of ~260 nm, respectively.

At S203, a monolayer of second removable spheres is disposed on the electrically conductive material layer formed at S202. The same process as that used for disposing the monolayer of the first removable spheres can also be used for disposing the monolayer of the second removable spheres. The monolayer of the first removable spheres, the layer of electrically conductive material and the monolayer of the second removable spheres together form a template, also referred to herein as, double-layer colloidal crystal template or DCC template. Similar to the monolayer of the first removable spheres, the second removable spheres are arranged in the monolayer in a hexagonal close-packed arrangement as can be seen in FIG. 3B, which shows a scanning electron micrograph of the DCC template (the inset showing a side view of the DCC template; scale bar—2 μm). The second removable spheres are, thus, also arranged in a substantially honeycomb pattern on electrically conductive material layer in some embodiments.

A brochosome material, i.e., the material of which brochosomes are to be formed, is then electrodeposited on the template at S204. Without wishing to be bound by theory, the electrodeposited material is constrained to grow conformally on the first removable microspheres in the bottom layer of the DCC template and continues to grow from the electrically conductive material layer, which can act as a seed layer, up and around the second removable spheres in the top layer of the DCC template.

Various examples of brochosome materials are described elsewhere herein. The conditions of electrodeposition, however, depend on the particular brochosome material being electrodeposited. For example, if the brochosome material is a metal, the DCC template is used as a cathode, while for a metal oxide or conductive polymer brochosome material, the DCC template is used as an anode. Table 1 provides some examples of plating solutions and conditions for electrodeposition of some of the brochosome materials described herein.

TABLE 1

Electrodeposition materials and their respective plating solutions and conditions.

| Targeted Materials | Plating Solutions | Conditions |
|---|---|---|
| Silver | Silver nitrate and sodium dodecyl sulfate (SDS) | 1-5 V |
| Gold | Chloroauric acid | 1-5 V |
| Nickel | Nickel (II) sulfate, SDS, Boric acid | 1-5 V |
| PPy | Pyrrole, sodium dodecylbenzene sulfonate | 1-5 V |
| $MnO_2$ | Manganese acetate | 1-5 V |

Depending on the particular application, the brochosome material can be electrodeposited at a suitable thickness. The thickness of the electrodeposited brochosome material is in a range from about 50 nm to about 500 nm in various embodiments. The thickness of the brochosome material is controlled by the time for which the electrodeposition is performed (in addition to other conditions such as, for example, the concentration of the electrolyte, voltage between the cathode and anode, etc.).

At S205, the first and the second removable spheres are removed to form a layer of synthetic brochosomes of the brochosome material on the substrate. In various embodiments, the first and the second removable spheres are removed by dissolution in a suitable solvent such as, for example, dichloromethane.

In some embodiments, it may be desirable to obtain free floating synthetic brochosomes in bulk rather than as a coating. Free floating synthetic brochosomes can be formed by performing an additional oxygen plasma etching step between S201 and S202 to shrink the size of the first removable spheres on the substrate. This additional step facilitates the release of the formed synthetic brochosomes from the substrate when the first and second removable spheres are removed, resulting in hollow synthetic brochosome structures.

Various properties of synthetic brochosomes and coatings containing synthetic brochosomes formed in accordance with the embodiments of the present disclosure are described below. Given the wide variety of brochosome structures that can be formed, properties of only a small subset of brochosomes will be described for brevity as a representative of various aspects of the present disclosure. The methods and techniques described herein should provide those skilled in the art to understand the general principles of investigating and studying synthetic brochosomes within the scope of the present disclosure.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Representative samples of synthetic BCs were created by first preparing a highly ordered DCC template, followed by site-specific electrodeposition on the template. The DCC template was prepared through a layer-by-layer stacking process. First, a monolayer colloidal crystal (MCC) template (>2 cm$^2$) composed of polystyrene (PS) spheres was prepared by spin-coating, and was then transferred onto the water/air interface. An arbitrary substrate was used to pick up the free-standing MCC template from underneath. The substrate could be in the form of a smooth, flexible, curved, or roughened surface. A thin layer of gold (Au) film (~100 nm) was then deposited onto the MCC template. Next, another layer of MCC template comprised of smaller PS spheres was transferred onto the Au-coated MCC template, yielding the DCC template, which was then used as the working electrode to perform electrochemical deposition of targeting materials (also referred to herein as brochosome materials). The electrodeposited material was constrained to grow conformally on the large PS spheres in the bottom layer template and continue to grow from the Au seed layer up and around the small PS spheres in the top layer template. After removing the PS spheres (by dissolving in dichloromethane), BCs of the targeting materials can be obtained. The final structures closely mimic those of the natural brochosomes. Silver (Ag) was used as a model targeting material to investigate the fabrication parameters of the synthetic BCs.

Depending on the size of PS spheres in the top layer template, the as-deposited Ag BCs (with PS spheres) display different colors. The Ag BCs become dark in color after dissolving the PS spheres. The reflection spectra revealed that the reflection is continuously reduced as the pit depth is increased until $h=0.55R_t$. Unlike planar metals which behave as excellent mirrors, the synthetic BCs consist of metal nanoparticle assemblies and the nanoscale pits which can significantly suppress reflection. FIG. 4 shows a plot showing the reflection spectra of Ag mirror (in green), Ag honeycomb mesoporous film (in blue), Ag nanoporous film (in red), and Ag BCs (in black). The reflection on the synthetic BCs at an incident angle of 45° in the ultraviolet (LTV) (250 nm-380 nm), visible (Vis) (380 nm-780 nm), and near infrared (NIR) (780 nm-2000 nm) region is below 0.4%, 0.2%, and 1.4% respectively when the pit opening size is ~470 nm with a depth of ~260 nm, respectively. As illustrated in FIG. 4, these values are substantially lower than those of the control samples including thermally evaporated planar Ag membrane or the Ag nanoporous film prepared using the same electrodeposition method, or the planar Ag mesoporous film embedded with honeycomb arranged pits.

The antireflection of the 2 μm brochosome arrays can be further improved by modifying the indentations, i.e., pit size. In particular, optimized antireflection properties in the 250-2000 nm wavelength range can be achieved when the ratio of the pit depth and the diameter of the pit-creating PS spheres $h/R_t$ is 0.6 according to FDTD simulation results, which agrees well with the experimental results (i.e., $h/R_t$~0.55). These results further highlight the importance of the pits for antireflection, which are absent in the conventional moth-eye mimicking antireflective coatings. Furthermore, the antireflection performance of the optimized BCs with ~2 μm thickness is much higher than that of the black silicon formed by nanowire arrays with lengths similar to our brochosome diameters, and is comparable to those comprised of 30 μm-long Si nanowire arrays. These results indicate that the special geometry of the brochosome is more efficient than that of nanowire arrays in suppressing the light reflections.

Omnidirectional Antireflection of BCs:

The antireflection property of the BCs was found to be insensitive to the angle of the incident light owing to the "moth-eye" like arrangement of the pits. Specifically, as the incident angle varies from 8° to 45°, the reflectance from the BCs is <0.25% in the visible region and <1.5% in the 700 nm-2000 nm region. For an incident angle as large as 65°, the BCs still maintain low reflectance of <0.7% in the visible region, and <8% in the wavelength region of 700 nm-2000 nm. In comparison, the reflection spectrum of the planar mesoporous Ag film composed of hexagonally arranged nanovoids demonstrated strong angle dependence. This further confirmed that the omnidirectional antireflection property of the BCs is attributed to the "moth-eye" like arrangement of the pits. Overall, the experimental measurements showed that omnidirectional antireflection occurs when $\lambda/R_t$ is small or when $R_t/R_b$ is small. For example, strong omnidirectional antireflection (i.e., reflectance <10%) of BCs can be attained when:

$$\sim 9\lambda > R_b > \sim 1.4\lambda \text{ (}\lambda\text{ is wavelength of the electromagnetic waves) and } \sim 2\lambda > R_t > \sim 0.5\lambda\text{, and } R_t/R_b < 0.35 \text{ (or } n > \sim 7\text{)}.$$

BCs for Camouflage:

The ultra-antireflective property of the synthetic BCs at the UV and visible light range may suggest that their natural counterparts could have been optimized for antireflective and camouflage functions against leafhoppers' predators (e.g., birds or insects), whose active vision spectra are also in the UV and visible light range. To demonstrate the possible camouflage function of the BCs, the synthetic BCs next to various leaf species (i.e., *Chrysanthemum, Lantana, Callicarpa*, and *Fushia*) were placed, and their colors was compared through simulated visions of a ladybird beetle (a predator of leafhopper). Note that the active vision spectrum of a ladybird beetle is from 311 nm to 605 nm. Based on the images (incorporated herein by reference from U.S. Provisional Application No. 62/481,782 in interest of brevity) generated by the simulated vision of a ladybird, the appearance of the BCs and the green leaves have very high level of similarity qualitatively and quantitatively. This further suggests that the natural and synthetic BCs may possess similar antireflective properties, which could be important survival functions that protect leafhoppers or their eggs from being detected by their predators in their natural environments.

Experiments

Preparation of Double-Layer Colloidal Crystal (DCC) Template:

Glass slides (2.5 cm×7.5 cm) were treated in a plasma cleaner (Harrick Plasma, PDC-32G) for 10 mins to obtain a highly hydrophilic surface. Different amounts of aqueous dispersions composed of polystyrene (PS) latex beads (2.5 wt %, purchased from Alfa Aesar) were spin-coated onto the treated glass slides (Table 1). After dried in the ambient conditions, the glass slide covered by the PS spheres was immersed slowly into a water bath with the addition of ~0.01 g/L sodium dodecyl sulfate (SDS) at an angle of ~65° from the normal of the water surface. The PS spheres would assemble into a monolayer film at the air/water interface. A piece of silicon wafer was used to pick up the free-standing monolayer colloidal crystal (MCC) template. Heat treatment at 110° C. for 3 min on a hot plate was performed to thermally anchor the PS spheres onto the silicon substrate before depositing a thin gold (Au) layer (usually 100 nm) onto the MCC template by a sputtering machine. Subsequently, the Au-coated MCC template was plasma-treated for 1 min to create a highly hydrophilic surface. Then, the Au-coated MCC template was used to pick up another layer of free-standing MCC template composed of smaller PS spheres floating at the air/water interface. During the drying process, the small PS spheres would assemble onto the large PS spheres to form a closely packed hexagonal array, leading to the formation of the DCC template.

Preparation of the Synthetic Brochosomal Coating:

MCC template was prepared by a previously reported spin-coating method (Yang, S. K., Cai, W. P., Kong, L. C. & Lei, Y. Surface nanometer-scale patterning in realizing large-scale ordered arrays of metallic nanoshells with well-defined structures and controllable properties. *Adv. Funct. Mater.* 20, 2527-2533 (2010)). Then a thin layer of Au film was evaporated onto the MCC template, which was used as a seed layer to guide the subsequent electrodeposition process. Another layer of MCC template was transferred onto the Au-coated MCC template to form the DCC template. The DCC template was used as the cathode for metal electroplating. The electrolyte for silver plating contained 30 mM silver nitrate and 7 mM SDS. The electrolyte was maintained at a temperature of 45° C. on a hotplate. The deposition voltage and time was 1.5 V and 8 min unless otherwise specified. Electroplating of Au was performed in pure 10 mM $HAuCl_4$ aqueous solutions at 2.5 V for 5 min. Nickel electrodeposition was carried out in 1.1 M $NiSO_4$, 10 mM SDS, and 0.65 M $H_3BO_3$ with the pH value adjusted to 3 using $H_2SO_4$ at 3 V for 15 min. The DCC template was used as the anode for polypyrrole (PPy) and metal oxide deposition. For PPy deposition, the electrolyte was formed by 0.1 M pyrrole and 0.1 M sodium dodecylbenzene sulfonate. The deposition voltage for PPy was 1.5 V for 1 min. Electroplating of manganese oxide ($MnO_2$) was conducted in 0.1 M manganese acetate at 3 V for 4 min. After immersing the electroplated DCC template into dichloromethane for 1 min to remove the PS spheres, BCs of the electroplated material are obtained. Step-by-step electroplating can create BCs of hybrid materials. For example, Ag/$MnO_2$ BCs were created by electroplating of Ag for 5 min and $MnO_2$ for 3 min using the above electrolytes after dissolving the DCC template using dichloromethane.

Preparation of Control Samples:

The Ag mesoporous films were prepared using MCC template on a piece of Au-coated silicon wafer as the cathode electrode with the same electrolyte for the growth of Ag BCs. The deposition voltage was 1.5 V and the electroplating time was 6 min. The electrodeposited Ag film was deposited on a piece of Au-coated silicon wafer in the same electrolyte solution at 1.5 V for 10 min.

Fabrication of Black Silicon:

Black Si was prepared using a deep reactive ion etching method according to a previous publication (C. K. Kang, et al. The fabrication of patternable silicon nanotips using deep reactive ion etching. *J. Micromech. Microeng.* 18, 075007 (2008)).

UV-Vis-NIR Measurements:

The UV-Vis-NIR reflection spectra in the wavelength range of 250 nm-200 nm were measured (Lambda 950, Perkin-Elmer). The incident angles can be varied from 8° to 68°.

Fdtd Simulations:

FDTD simulations were carried out using the commercial software Lumerical Solutions. Constrained by the computer resources, we did not consider the roughened sidewall structure of the brochosome, which consisted of numerous Ag nanoparticles ~30 mu to ~70 nm in size. Instead, we built the FDTD model of BCs using smooth Ag shells with ordered pits for simplicity. As a result, our model did not capture the antireflection contributions due to the roughened sidewall of the BCs in the experiments, which is known to effectively suppress reflection. While the use of smooth Ag shells as FDTD models gives rise to significantly increased reflection compared to the experimental measurements, the qualitative trend of the reflection spectra can still be revealed by the FDTD simulation results. The ordered pits were created using the open source software Blender. In this model, we first created an MCC template composed of small spheres in the software. Then, a small force was applied to place the MCC template onto the large PS spheres and simultaneously apply a weak attraction force between the small PS spheres to maintain a close packing of the MCC template. We then increased the diameter of the large PS spheres to the extent that it can bury half of the small PS spheres. Finally, we converted the large PS spheres into Ag shells with a shell thickness equal to the radius of the small PS spheres. We set the materials property of the small PS to be vacuum to better represent the actual BC configurations in our experiments. The models were then input to the software for FDTD simulations.

Uv Photography:

To mimic the vision of insects and birds, we first modified the camera (Canon T4i) to be UV sensitive by LifePixel (Mukilteo, Wash.). Then we used a software micaToolbox developed by Jolyon Troscianko, et al. to simulate the vision as observed by insects and birds[5]. To create the simulated images, we first used the UV and regular camera to take photographs on the Ag BCs lying on a green leaf under sunlight, respectively. Then the toolbox converted the photos to multispectral objective images consisting of all RUB and UV channels.

Evaluation Method of Color Difference in Non-Human Visual Systems:

We used a published method for comparing colors in non-human visual systems, which is based on Vorobyev and Osorio's (1998) receptor noise model (D. Osorio & M. Vorobyev, Photoreceptor sectral sensitivities in terrestrial animals: adaptations for luminance and colour vision. (*Proc. R. Soc. B Biol. Sci.* 272, 1745-1752 (2005)) implemented in MICA. This method calculates the distance between two colors with the unit JND (just noticeable difference). This unit is based on the signal-to-noise ratios of each channel of the specific animal visual system. If the JND value between two colors is less than one, then the images are said to be indiscriminable. However, if the value is above ~3, then the images are said to be discriminable under good lighting conditions (A. Siddiqi, T. W. Cronin, E. R. Loew, M. Vorobyev & K. Summers, Interspecific and intraspecific views of color signals in the strawberry poison frog Dendrobates pumilio. *J. Exp. Biol.* 207, 2471-2485 (2004)). The Weber fraction used is 0.05 based on ladybird and human's visual system (J. T. Lin, Identification of photoreceptor locations in the compound eye of *Coccinella septempunctata* Linnaeus (Coleoptera, Coccinellidae), *Journal of Insect Physiology*, 39, 555-562 (1993)). Data is measured from 32-bit normalized objective images processed by MICA Toolbox.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A layer comprising a plurality of interconnected synthetic brochosomes, the synthetic brochosomes comprising:
   a spherical portion having an interior surface, the interior surface having a shape that is at least a portion of a first sphere having a first diameter; and a plurality of outgrowths that define a plurality of indentations, the plurality of outgrowths having size and shape consistent with deposition growth that is radially outward from the interior surface and around a plurality of removable structures, the plurality of indentations having a shape that is a negative imprint of one of the plurality of removable structures, the plurality of indentations each having a second diameter, wherein the second diameter is smaller than the first diameter, wherein the spherical portion is formed of a material that is capable of receiving an electrodeposition-compatible material, wherein the plurality of outgrowths are formed of the electrodeposition-compatible material.

2. The layer of claim 1, wherein the first diameter is in a range from 1 μm to 10 μm.

3. The layer of claim 1, wherein the second diameter is in a range from 100 nm to 1 μm.

4. The layer of claim 1, wherein the plurality of indentations form a honeycomb pattern.

5. The layer of claim 1, wherein a ratio of the second diameter to the first diameter is less than 0.35.

6. The layer of claim 1, wherein the spherical portion has a first radius, and the sphere has a second radius, wherein the first radius is less than 9 times a predetermined wavelength of light, and the first radius is greater than 1.4 times the predetermined wavelength of light, and wherein the second radius is less than 2 times the predetermined wavelength of light, and the second radius is greater than 0.5 times the predetermined wavelength of light.

7. The layer of claim 6, wherein the predetermined wavelength of light falls within at least one of the following regions:

ultraviolet light region;

visible light region; or near infrared light region.

8. The synthetic brochosome of claim 1, wherein adjacent indentations define a protrusion of the coating.

9. An antireflective coating comprising:

a substrate; and the layer of claim 1 disposed on the substrate wherein the layer is a monolayer.

10. The antireflective coating of claim 9, wherein the coating has a reflectance of less than 10% at a wavelength in a range from 250 nm to 2000 nm.

11. The antireflective coating of claim 7, wherein the synthetic brochosomes are arranged to form a pattern, the pattern being substantially a honeycomb pattern.

* * * * *